United States Patent [19]

Hinterseer

[11] Patent Number: 5,403,421
[45] Date of Patent: Apr. 4, 1995

[54] METHOD OF WELDING HALOGEN-FREE THERMOPLASTIC FOILS

[75] Inventor: Heinz Hinterseer, Freilassing, Germany

[73] Assignee: Paul Kiefel Hochfrequenz-Anlagen GmbH, Freilassing, Germany

[21] Appl. No.: 22,655

[22] Filed: Mar. 1, 1993

[30] Foreign Application Priority Data

Feb. 28, 1992 [DE] Germany .................. 42 06 262.4

[51] Int. Cl.$^6$ ............................................. B32B 31/00
[52] U.S. Cl. ............................... 156/196; 156/286; 156/289; 156/311; 156/313
[58] Field of Search ............... 156/286, 272.2, 272.4, 156/274.4, 275.1, 380.3, 380.4, 380.5, 380.6, 69, 380.7, 583.1, 583.6, 583.7, 583.8, 583.9, 311, 313, 289, 196

[56] References Cited

U.S. PATENT DOCUMENTS

| | | | |
|---|---|---|---|
| 2,667,437 | 1/1954 | Zoubek | 156/275.1 |
| 2,744,655 | 5/1956 | Vnuk | 156/272.2 |
| 3,600,248 | 8/1971 | Mojonnier et al. | |
| 4,743,328 | 5/1988 | Zwirner | 156/380.4 |
| 4,857,129 | 8/1989 | Jensen | 156/274.4 |
| 4,950,347 | 8/1990 | Futagawa | 156/274.4 |
| 4,960,479 | 10/1990 | Yasuda et al. | 156/274.4 |
| 5,098,498 | 3/1992 | Hale et al. | 156/286 |
| 5,157,895 | 10/1992 | Shibauchi et al. | 156/583.1 |
| 5,164,254 | 11/1992 | Todd et al. | 156/286 |

FOREIGN PATENT DOCUMENTS

| | | |
|---|---|---|
| 0291854A2 | 11/1988 | European Pat. Off. |
| 0387373A2 | 3/1989 | European Pat. Off. |
| 2586498 | 2/1987 | France |
| 3807164C2 | 3/1990 | Germany |
| 1407654 | 9/1975 | United Kingdom |
| 2066152 | 7/1981 | United Kingdom |

OTHER PUBLICATIONS

Pat. Abstr. of Japan, vol. 16, No. 529, Oct. 29, 1992 Translation (4 pp.) of claims 1 to 15 of the reference (as mentioned in the Information Disclosure Statement).

*Primary Examiner*—Chester T. Barry
*Attorney, Agent, or Firm*—Friedrich Kueffner

[57] ABSTRACT

A method and an apparatus for welding halogen-free thermoplastic foils or plates, wherein one or more layers or inserts such as, e.g., reinforcement layers, are placed between the foils. The apparatus includes a welding tool which can be heated to the desired welding temperature and a countertool which can be adjusted to a temperature below the melting temperature of the foils. The countertool has a profile which corresponds to the desired welding or stamping contour, particularly a cutting edge. A heat-conducting separating foil can be placed in the welding apparatus for transmitting thermal energy produced by the welding tool and required for plasticizing the thermoplastic foils to the thermoplastic foils, wherein the foils can be separated from the separating foil after cooling. The method includes the steps of three-dimensionally pre-shaping at least one of the foils, so as to form an indentation and a foil support edge raised relative to the indentation. The lower foil is supported in the area of the foil support edge before or after insertion of the layer or layers in the indentation. Subsequently, the other foil is placed on the layer or layers and the support edge. The foils are lined or centered by means of a separating foil which extends in the region between the welding tool and the countertool in the form of a mask extending only along the support edge. Finally, the foils are welded in the support edge region with the intermediate arrangement of the separating foil between the welding foil and the thermoplastic foils.

9 Claims, 2 Drawing Sheets

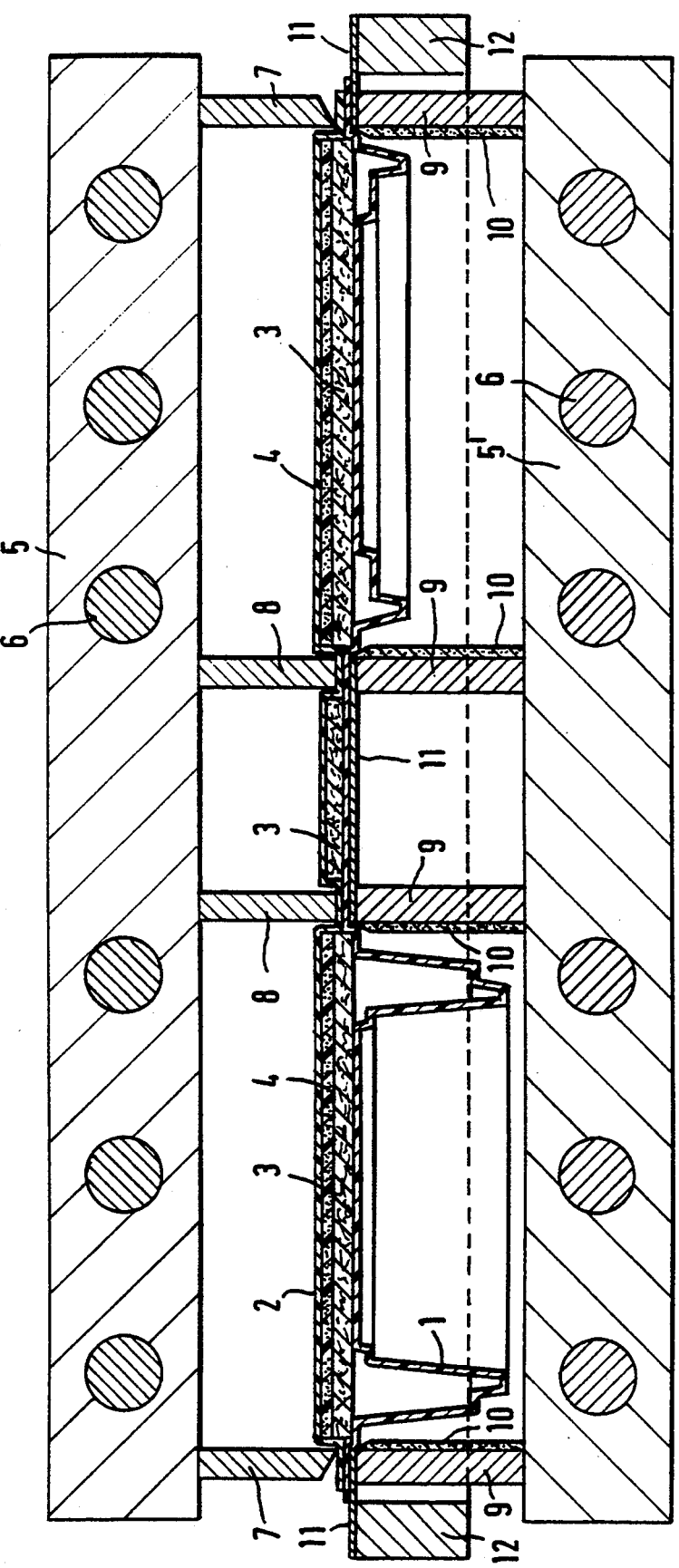

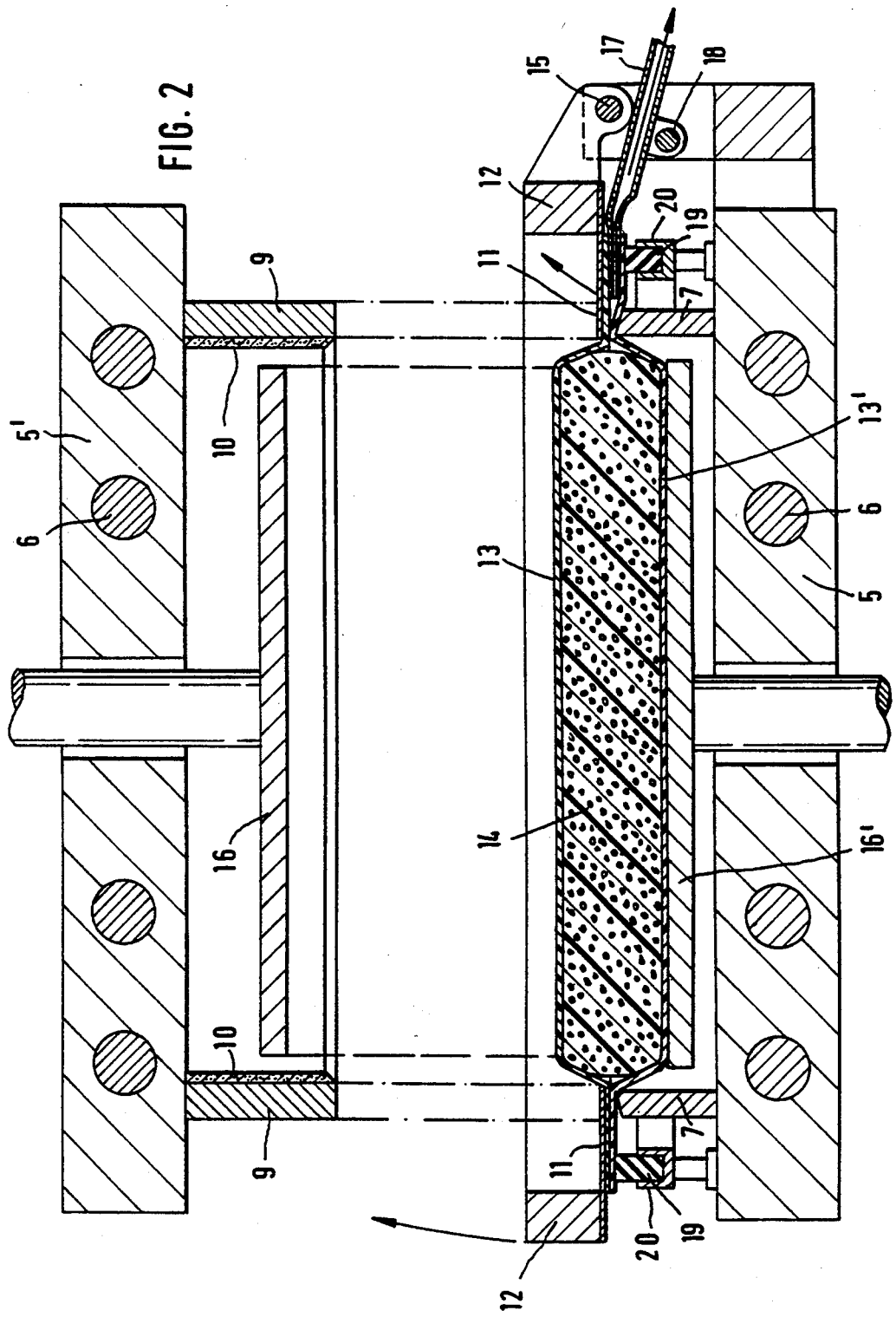

METHOD OF WELDING HALOGEN-FREE THERMOPLASTIC FOILS

BACKGROUND OF THE INVENTION

1. Field of the Invention

The present invention relates to a method of welding halogen-free thermoplastic foils or plates having intermediate layers, such as, for example, reinforcement layers placed between the thermoplastic foils. The method is carried out by means of a welding apparatus which includes a welding tool which can be heated to the desired welding temperature and a countertool which can be adjusted to a temperature which is below the melting temperature of the foils. The countertool has a profile which corresponds to the desired welding or stamping contour, particularly a cutting edge. The apparatus further includes a heat-conducting separating foil which can be placed in the welding apparatus and through which the thermal energy produced by the welding tool and required for plasticizing the thermoplastic foils is transmitted to the thermoplastic foils and from which the foils can be separated after the foils have been connected and after cooling.

2. Description of the Related Art

In a method of the above-described type known from German Patent 38 07 164, one of the two foils to be welded together, i.e., the lower foil, is pulled by means of a vacuum into a trough formed by one of the two tools of the welding press. In this manner, a bed for receiving and centering the layers, such as, e.g., reinforcement layers, is created. The lower foil has an edge portion which extends in a flat plane. Contacting this edge portion of the lower foil are the other foil, i.e., the upper foil, as well as the separating foil which is of high heat-resistant material, for example, polyimide, through which the major portion of the welding energy is supplied. As a result of this configuration, the welding seam is produced immediately on the separating foil even when reinforcement layers are provided. This is because the upper foil remains in contact with the separating foil, and the entire additional foil material required for sheathing the reinforcing layers must be obtained from the lower foil. This known method makes it possible to produce foldable objects, such as book covers, folding containers, and the like. However, this method does not make it possible to produce a welding seam approximately in the center plane of the reinforcement layers, as it is required, for example, in the manufacture of automobile sun visors.

SUMMARY OF THE INVENTION

Therefore, it is the object of the present invention to further develop the above-described known method in such a way that it is also possible to produce objects of halogen-free thermoplastic foils in a thermal contact process in which the welding seam extends in a plane which extends between the two outer surfaces of the object.

In accordance with the present invention, the above-mentioned method includes the steps of three-dimensionally pre-shaping at least one of the two foils, i.e., the lower foil, in a thermal shaping process, so as to form an indentation and a foil support edge which is raised relative to the indentation. The pre-shaped lower foil is supported in the area of the foil support edge before or after inserting one or more layers, such as reinforcement layers, in the indentation. Subsequently, the other foil, i.e., the upper foil, is placed on the one or more layers and the support edge. The foils are aligned or centered by means of a separating foil extending in the region between the welding tool and the countertool in the form of a mask extending only along the support edge. Finally, the foils are welded in the support edge region with the intermediate arrangement of the separating foil between the welding tool and the foils, wherein the separating foil is shaped in accordance with the shape of the support edge.

The method according to the present invention makes it possible to produce objects, such as automobile sun visors, video cassette cases, blister packs, or the like, which have two three-dimensionally shaped outer sides of plastic foil, one or more elastic cores, and a welding seam which extends approximately in the center plane of the insert or layer, such as a reinforcement layer.

Since the mask is required to have a shape which corresponds to the shape of the support edge, it is particularly advantageous to use a separating foil forming the mask which is of thin sheet metal or a heat resistant plastic foil. This mask not only provides an anti-stick function between the welding tool which supplies the welding energy and the foils to be welded, the mask also facilitates the manipulation of the unit with the two foils because of the stiffness of the mask. It is particularly advantageous in this connection if the mask is used for supporting the support edge of the pre-shaped lower foil which carries in its indentation the inserted layer.

In accordance with another advantageous feature, a frame is used for vertically manipulating the mask, together with the one or more layers and the lower foil and the upper foil relative to the welding tool.

In accordance with another useful feature, a layer is used which is at least partially of elastically resilient material, and a load is applied on the upper foil in the edge region in the direction toward the support edge of the lower foil, such that the layer is at least partially compressed. In this connection, in order to obtain a problem-free and durable welding seam at which the elastic foils are kept at a tensioned state, it has been found very advantageous if the layer is maintained in a compressed state, at least during the welding procedure and immediately following the welding procedure during the cooling phase. This can be achieved by subjecting the layer and the foils adjacent the layer to the external application of pressure. On the other hand, it has also been found advantageous if the layer is maintained in a compressed state by evacuating the space surrounded by the foils.

The present invention is also directed to an apparatus for carrying out the above-described method.

The apparatus according to the present invention includes a welding tool and a countertool of a welding press. The welding tool and the countertool are arranged one above the other, and at least one of the tools can be moved upwardly and downwardly relative to the other tool. The welding tool has welding webs, and the countertool has inner and outer webs facing the welding webs. The outer webs include a continuous cutting edge. Mounted on a frame is a separating foil which can be inserted by means of the frame into the region between the support edges of the lower foil and the upper foil, which are to be welded together and rest against the inner and outer webs of the countertool during the welding procedure. The present invention provides that the separating foil has at least one cutout with a rim extending within the inner edges of the welding webs.

When articles are to be produced which have portions which can be folded toward each other, for example, videocassette cases, it has been found particularly advantageous if the separating foil has several cutouts which are shaped as required by the article and in which can be placed the portions of the lower foil or of the upper foil which have been pre-shaped in a thermal shaping process.

In order to protect the pre-shaped portions of the foils introduced into the welding press against the disadvantageous influence of heat, it is advantageous if the welding webs are lined with a cover of poorly heating-conducting material on the sides facing the cutout or cutouts.

In order to protect the welding seams while they are still hot immediately after the welding procedure, i.e., in order to ensure the tensioned state of the foils in the finished article, it is very advantageous if a pressure plate for the application of pressure to the lower and upper foils with the intermediate layer is provided in the region defined by the webs of the welding tool and/or the countertool. For this purpose, an advantageous feature provides that the pressure plate is connected to a push rod which facilitates the pressure application and which extends through an opening provided in the welding tool or in the countertool.

In accordance with another advantageous development, instead of the pressure plate with push rod, or also in addition thereto, the apparatus according to the invention may include a rubber-elastic ledge extending along the support edge of the foil, and which support edge is facing away from the mask cutout. The ledge is provided for holding the two support edges of the lower foil and upper foil against each other prior to welding. In addition, a flat piece of pipe may be provided which is connectable to an evacuating unit and which can be inserted in the region of the support edges between the lower foil and the upper foil, but outside of the welding edge region.

A particularly practical manipulation of the apparatus is achieved if the pipe piece is mounted so as to be foldable upwardly about a horizontal axis from the support edge region. The practical use of the apparatus is further improved if the frame for inserting and removing the foil blanks and for supporting the separating foil constructed in the form of a mask is mounted so as to be upwardly pivotable about a horizontal axis.

Although the process and apparatus of the present invention has been described for the welding of thermoplastic foils, this description should not be so limited, as it may be appropriate to connect thermoplastic plates in the same manner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic vertical sectional view of a first embodiment of the apparatus according to the present invention; and FIG. 2 is another schematic vertical sectional view of a modified embodiment of the apparatus of the present invention.

DESCRIPTION OF THE PRESENTLY PREFERRED EMBODIMENTS

As illustrated in FIG. 1, a three-dimensionally pre-shaped lower foil 1 of plastics material, possibly hard plastics material, which may form, for example, the inner part of a video cassette case, is joined together with a soft upper foil 2 with the intermediate arrangement of one or more layers, such as, e.g., stiffening reinforcement layers or inserts 3, 4, which may be, for example, a cardboard layer 3 and an additional foam foil 4 on top of the cardboard layer 3.

The longitudinal sectional view of FIG. 1 shows a video cassette case and the components of the welding device as they surround the video cassette case at the moment of the beginning welding process. The welding device includes a welding tool 5' and a countertool 5 in the form of heating plates of a metal of good thermal conductivity, for example, aluminum. The heating plates are heated by means of suitable elements, for example, electrically heated rods 6, and the desired temperature of the heating plate is maintained by means of conventional temperature regulating units.

Welding webs 7 with integrally formed cutting edges are mounted on the upper heating plate of the countertool 5 and extend along the outer contour of the article to be manufactured. A base plate shaped in accordance with the tool may be placed on the countertool 5. The welding webs 7 are of a wear-resistant, thermally conductive metal, for example, brass. In the region of the so-called rear seams of the video cassette case, stamping webs 8 of the same material are provided. On the operative side, the stamping webs 8 may be provided either with a smooth surface or with an engraved profile, for example, a longitudinally or transversely extending corrugation.

Welding webs 9 are mounted on the lower heating plate of the welding tool 5' opposite the webs 7 of the upper heating plate of the countertool 5. The welding webs 9 have a flat, active side, and the width thereof is greater than the width of the oppositely located webs 7 of the countertool 5. The welding webs are preferably provided on the inner surfaces thereof with linings 10 of poorly heat-conductive material which have the purpose of essentially reducing the thermal radiation to the adjacent lower foil 1.

The pre-shaped lower foil is placed with its foil support edge on a separating foil 11, in the form of a mask extending only along the support edge. The separating foil 11 is of a thin sheet metal which has cutouts in the regions of the portions of the lower foil 1 to be welded which extend downwardly from the welding plane. Accordingly, the separating foil 11 simultaneously serves for centering the lower foil 1 relative to the welding tool 5' with the welding webs 9 as well as, if necessary, for transporting the lower foil into and out of the welding tool.

The separating foil or mask 11, in the example depicted herein, is mounted on a frame 12 which is vertically movable relative to the welding tool 5' and the countertool 5.

In order to prevent the foil material from adhering to the upper webs 7, 8, these upper webs 7, 8 are heated to a temperature which is below the melting temperature of the plastic foils to be welded; accordingly, in the case of polypropylene, the temperature is between 110°–140° C. The temperature of the lower welding webs 9 is substantially higher, i.e., between 180°–250° C. in the case of polypropylene.

The two heating plates of the welding tool and the countertool are mounted in a suitable manner, so as to be movable relative to each other in a frame of a conventional welding press. The force with which the plates are pressed together can be adjusted in accordance with the size of the article to be welded.

The above described apparatus is operated as follows:

After removing an article which has just been finished from the mask and moving it outside of the welding area, the lower foil 1, and then the reinforcement layers or inserts 3, and possibly 4, are inserted. These components are centered in their positions relative to the lower foil 1, either in a positively engaging manner by means of indentations formed in the lower foil or by means of known auxiliary devices, so-called cardboard centering devices, which are pulled back only a short time before the welding press is closed. Finally, the upper foil 2 is placed on the lower foil 1, and the inserts 3, 4 and the components to be welded together, are conveyed, together with the mask formed by the separating foil 11, into the welding area.

Subsequently, the welding press is closed. It is advantageous if the lifting movements of the heating plates of the welding tool 5' and the countertool 5 are controlled in such a way that the mask 11 is merely supported by the lower welding webs 9 but is not lifted by the lower welding webs 9.

The welding press remains closed during a predetermined welding period during which an adjusted welding force is applied. During the welding period, thermal energy is introduced from the upper webs 7, 8 of the countertool 5, and particularly from the lower welding webs 9, through the thermally conductive separating foil to the portions of the foils to be welded together, so that these portions are softened. As a result, the upper webs 7, 8 partially displace the molten foil material to the outside and approach the separating foil 11 until the cutting edge of the web 7 almost contacts the upper side of the separating foil 11.

Subsequently, the welding tool 5' with the welding web line is pulled downwardly, while the webs 7, 8 of the countertool 5 still rest on the separating foil 11. However, the webs 7, 8 do not apply a pressure, so that bursting of the welding seam, which is still hot, is prevented.

After a predetermined, so-called after-effect period has expired, the countertool 5 is also retracted, and the separating foil 11 formed by the mask is transported, together with the welded article, into a cooling tool by means of conventional conveying units, such as rotary tables or linear conveying units (tray conveyors, etc.). This cooling tool has halves which are constructed geometrically in the same manner as the two halves of the welding device. However, the halves of the cooling tool are maintained at a temperature which is as low as possible (generally approximately room temperature). The cooling tool is mounted in a cooling press which is constructed essentially in the same manner as the welding press, but operates with lower forces.

FIG. 2 of the drawing shows an apparatus for manufacturing a shaped article having an elastic insert, for example, an automobile sun visor.

In the apparatus of FIG. 2, a web 7 which carries out a stamping function is mounted on the countertool 5 which forms the lower heating plate and which, in this case, is maintained at a temperature below the melting point of the foil. On the other hand, the welding web 9, with a thermally insulating lining 10, is mounted on the welding tool 5' formed by the upper heating plate, wherein the welding tool 5' in this case is maintained at a temperature above the melting point of the foil material.

In the embodiment of FIG. 2, the lower plate-shaped countertool 5 additionally serves for transporting the article to be welded into and out of the welding press.

The article to be manufactured, for example, an automobile sun visor, is composed of two soft foils, namely, the lower foil 13' and the upper foil 13, as well as an elastic reinforcement 14 in the form of a foam core placed between the foils. The lower foil 13' and the upper foil 13 are to be welded together without projections at the circumference, i.e., without an edge.

In order to prevent the formation of creases in the edge regions of the foils 13, 13' when they are placed around the foam core 14, the foils 13, 13' are advantageously three-dimensionally pre-shaped in a preceding thermal shaping process.

Initially, the lower foil 13' is placed in and centered by the lower webs 7 which have a cutting edge. Subsequently, the foam core 14 forming the reinforcement layer or insert is placed in and centered by the indentation of the lower foil 13'. Finally, the upper foil 13 is placed on the foam core 14.

The frame 12, which had been folded up about a horizontal axis 15 for inserting the above-mentioned components, is now folded down with the separating foil 11 formed by the mask and, thus, the frame holds the inserted components during the transport into the welding press with a precise fit on the lower countertool 5.

Subsequently, the welding procedure is carried out in the same manner as described in connection with FIG. 1 by moving down the welding tool 5'.

The elastic restoring forces of the foam core mean that the freshly produced welding seam tends to burst open after the welding device has been opened. On the other hand, for optical reasons, it is desirable that the welded foils 13, 13' surround the foam core 14 as tightly as possible.

In order to solve this problem, two solutions are possible. First, pressure plates 16, 16' are arranged in the interior of the tools 5, 5'. The pressure plates are mounted on push rods which extend through an opening provided in the welding tool or in the countertool. The push rods make it possible to move the pressure plates 16, 16' relative to the tools 5, 5', so that the foam core 14 is compressed by the application of pressure before, during, and after the welding procedure. As a result, tensions in the border region of the soft foils are essentially eliminated.

The second possibility for eliminating creases is to insert a flatly compressed pipe piece 17 outside of the webs 7 between the two foils 13, 13' in the support edge region. The pipe piece 17 can be folded up about a horizontal axis 18 for inserting the lower foil 13'. The pipe piece 17 has the purpose of withdrawing any hair trapped between the foils by means of an evacuating device, not shown. A sealing frame, for example, in the form of a rubber-elastic ledge 19, is used for sealing the support edges of the two foils 13, 13'. The ledge 19 is supported, for example, in a metal frame 20 through thermally insulating support elements on the lower heating plate and presses the two foils against the separating foil 11 formed by the mask.

The negative pressure produced in the interior of the sun visor in this manner remains effective even after the welding device is opened and, thus, prevents bursting of the welding seam.

After the articles produced in accordance with the above-described methods are removed from the welding device, the foil edges of the articles are torn off manually along a notch produced on the circumference by the cutting edges of the webs 7.

It should be understood that the preferred embodiments and examples described are for illustrative purposes only and are not to be construed as limiting the scope of the present invention which is properly delineated only in the appended claims.

I claim:

1. A method of welding halogen-free thermoplastic foils or plates, wherein a layer is placed between a first foil and a second foil, the method being carried out by means of a welding apparatus, including a welding tool heatable to a desired welding temperature and a countertool heatable temperature below a melting temperature of the foils, the countertool having a profile corresponding to a desired welding contour, further including a heat-conducting separating foil placable in the welding apparatus for transmitting to the foils thermal energy produced by the welding tool and required for plasticizing the foils, wherein the foils after being connected with each other and after cooling can be separated from the separating foil, the method comprising the steps of:

three-dimensionally pre-shaping at least the first foil in a thermal shaping process, so as to form an indentation and a foil support edge which is on a vertically higher level than the indentation;

supporting the first foil at the foil support edge before or after inserting the layer in the indentation;

placing the second foil on the layer and on the foil support edge;

aligning and centering the first and second foils between the welding tool and the countertool by means of the separating foil extending in the form of a mask along the foil support edge; and welding together the first and second foils at the foil support edge with the separating foil shaped in accordance with the foil support edge being placed between the welding tool and the foils such that one side of the separating foil faces the welding tool and another side of the separating foil faces the foils.

2. The method according to claim 1, wherein the layer is a reinforcement layer.

3. The method according to claim 2, comprising vertically manipulating the mask, together with the reinforcement layer and the first and second foils relative to the welding tool, by means of a frame.

4. The method according to claim 2, wherein the reinforcement layer is at least partially of an elastically resilient material, further comprising applying a load to the second foil in an edge region thereof in a direction toward the support edge of the first foil, such that the reinforcement layer is at least partially compressed.

5. The method according to claim 4, comprising maintaining the reinforcement layer in a compressed state, at least during welding and immediately following welding during a cooling phase.

6. The method according to claim 5, comprising applying an external compressive load on the reinforcement layer through the first and second foils.

7. The method according to claim 5, comprising maintaining the reinforcement layer in the compressed state by evacuating a space defined between the first and second foils.

8. The method according to claim 1, comprising aligning and centering the foils by means of the separating foil in the form of a mask of thin sheet metal or heat-resistant plastics material.

9. The method according to claim 1, comprising supporting the foil support edge of the first foil by means of the separating foil.

* * * * *